Jan. 19, 1926.
1,570,086
J. C. SCHAFFER
NODULIZATION
Filed March 15, 1924
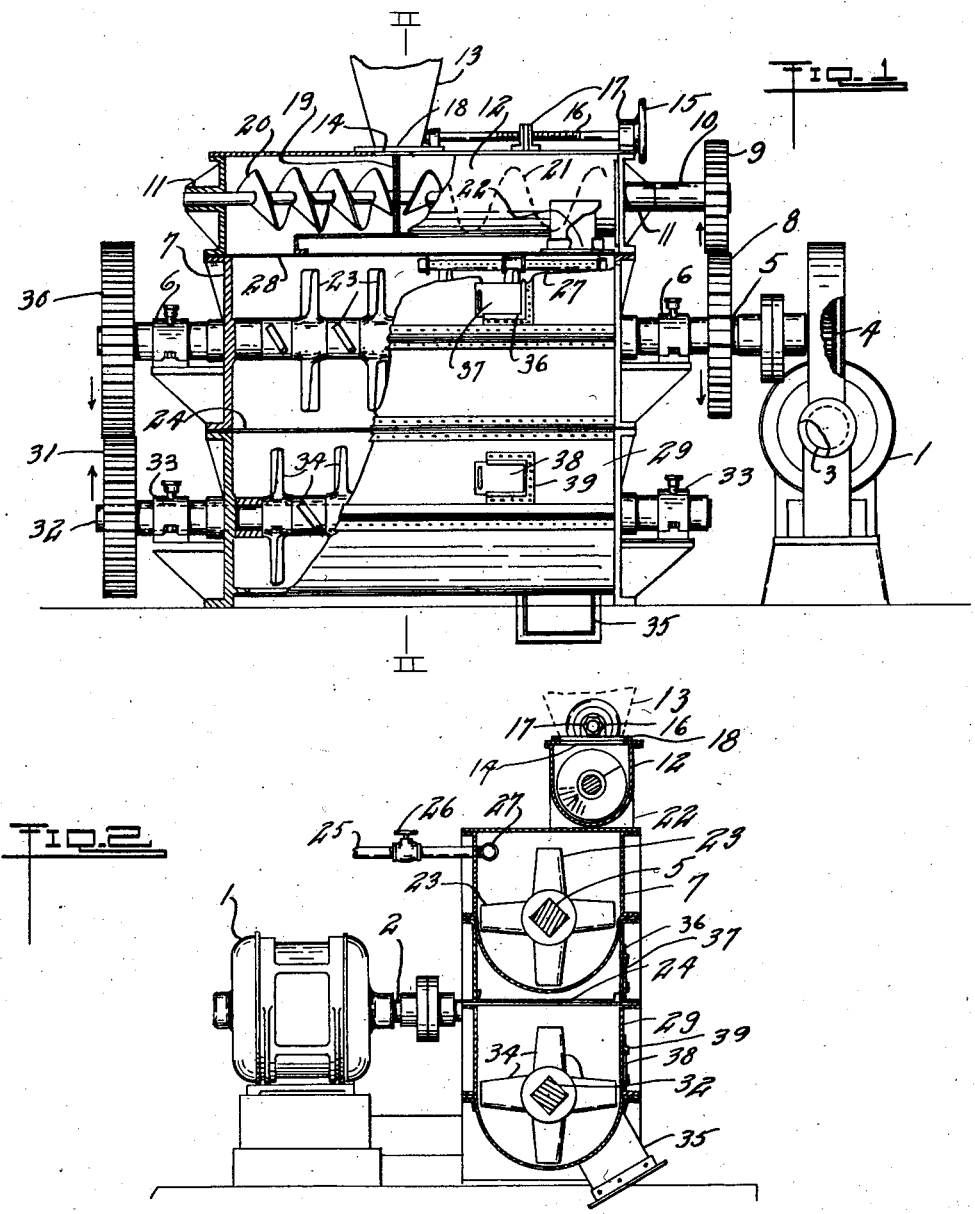
INVENTOR
BY 
ATTORNEY Patented Jan. 19, 1926.

1,570,086

UNITED STATES PATENT OFFICE.

JOHN C. SCHAFFER, OF PITTSBURGH, PENNSYLVANIA.

NODULIZATION.

Application filed March 15, 1924. Serial No. 699,610.

*To all whom it may concern:*

Be it known that I, JOHN C. SCHAFFER, a citizen of the United States, residing at Pittsburgh, Allegheny County, Pennsylvania, have invented new and useful Nodulization, of which the following is a specification.

This invention relates to the assembly of finely divided material into masses or nodules.

This invention has utility in the preparation of material for burning as of dolomite and limestone as carbonates to quick limes or oxides, and in connection with mixtures for the burning of ingredients into cement say as fed into rotary kilns.

Referring to the drawings:

Fig. 1 is a side elevation, with parts broken away, of an embodiment of the invention, and;

Fig. 2 is a section on the line II—II, Fig. 1.

Motor 1 is shown as provided with shaft 2 having thereon worm 3 in mesh with worm wheel 4 effective for driving at a reduced speed shaft 5 mounted in bearings 6 carried by housing 7. This shaft 5 has thereon gear 8 in mesh with pinion 9 on shaft 10 carried by bearings 11 from upper housing section 12 mounted on intermediate housing section 7. Chute 13 above the housing section 12 is disposed to spill loose material through opening 14 into this upper housing section 12. Hand wheel 15 on threaded rod 16 mounted in brackets 17 is effective to draw plate 18 between chute 13 and the opening 14 thereby to adjust the proportion of spill from the chute 13 between the opposite sides of the fixed partition 19 in the housing section 12 through which the shaft 10 extends. This housing section 12 on the side of the partition 19 remote from the pinion 9 has screw conveyer 20 of right hand pitch, while on the opposite side of this partition 19, this shaft 10 has thereon screw conveyer 21 of left hand pitch. This means that the loose material from the chute 13 as proportioned by the plate 18 falls through opening 14, one portion to travel as actuated by the conveyer 20 toward one end of the housing 12 while the other portion is simultaneously actuated by the conveyer 21 toward the opposite end of this housing 12. This housing 12 adjacent the pinion 9 has opening 22 so that the material as shifted by the screw conveyer 21 brings the material from the chute 13 to discharge into the housing 7 adjacent the gear wheel 8. The shaft 5 in the housing 7 has thereon arms 23 as agitators or stirrers to act upon this loose material from the housing 12 not only for stirring such material, but to urge such material from the end of the housing 7 adjacent the gear wheel 8 to the remote end of such housing 7 where there is bottom discharge opening 24. During this travel of the agitator, water supply line 25 has flow therefrom adjusted by valve 26 so that this flow of water by spray 27 in the housing 7 may temper the material from the conveyer 21. This mixture of moisture with the fine material is uniform.

The conveyer 20 moves material as supplied from the chute 13 to pass by opening 28 for falling through the housing 7 into the opening 24 simultaneously with the discharge of tempered material from the housing 7 through this opening 24 into lower housing 29. The shaft 5 remote from the gear wheel 8 carries gear 30 in mesh with gear wheel 31 on shaft 32 carried by bearings 33. This shaft 32 passes through the housing 29 and has thereon stirring and conveying arms 34 effective to thoroughly commingle the mixed delivery of tempered and untempered finely divided material. This stirring or agitation action of the arms 34 in the housing 29 rolls or balls up the material into clods or nodules in the conveying or progressing of the material from the end of this housing 29 adjacent gear wheel 31 so that this material when passing from this housing 29 by discharge 35 has the material all worked up into clods or nodules of some slight variation in size but generally of ball form and carrying only sufficient moisture to keep the material in a mass, which clods or balls are rather stable for handling. Inasmuch as this nodulizing of the material as herein disclosed is accurately adjustable for production of a uniform character and quantity of product, this device may be used directly as a feeder say for a rotary kiln or other continuous manufacturing processes.

In order that the operator of the installation may check accurately the operation of this machine for determining the product there is provided in guide 36 a side plate 37 to permit observation of the tempering action in housing 7 to be used as an aid to the operator in adjusting the valves 18, 26. Further observation as to checking the control valves may be had by operating slide plate 38 in ways 39 to permit observation of the nodulizing action in the housing 29.

In practice for instance when the material to be used is calcium carbonate or limestone such ground material, which may be of a size to have say 85 percent pass a 100 mesh sieve, may not of itself when moistened have sufficient coherence for maintaining clods or balls as definite bodies. Accordingly, the mixture therewith say 2 percent by weight of hydrate of lime supplies when reacted upon by water a sufficiently pasty mass with the lime for holding the material together in the nodulizing operation as herein disclosed. This shaft 5 rotates a little slower than the shaft 10 or the shaft 32.

What is claimed and it is desired to secure by United States Letters Patent is:—

1. Apparatus embodying means for tempering a finely divided material with liquid, supply means for uniformly combining said tempered material with a determined proportion of untempered material, and material agitating means for rolling said materials together into clods.

2. Apparatus for the continuous progression of a stream of material, means for proportionately dividing said material stream, moisture supply means for tempering said divided out portion, delivery means recombining the tempered with the untempered stream portions, and conveying means for rolling the united stream portions to form clods.

3. Apparatus for the production of clods from a finely divided material embodying a mixer for said material, means for delivering an adherent agent into said material at the mixer, moisture supply means continuously effective as to a portion of the material, and an agitator working said moistened portion into an unmoistened portion of the material to form clods thereof.

4. A supply chute, a supply dividing conveyer, a first agitator to which one division from the conveyer is delivered, tempering means in said agitator, a second agitator, and connections for commingling the other division from the conveyer and the material from the first agitator to the second agitator.

5. A supply chute, a two way conveyer to which said chute delivers, a moisture supply agitator to which one of the ways of the conveyer delivers, said other way from the conveyer having a discharge into which the first agitator delivers, and a second agitator to which the first agitator and said other way of the conveyer effect delivery by way of said discharge.

6. A housing, three conveyer shafts on said housing, right and left hand conveyers on one of said shafts, a one direction conveyer on the second of said shafts, and an opposite direction conveyer on the third of said shafts.

7. A housing, three conveyer parallel shafts in said housing, said shafts being one above the other, right and left hand conveyers on the upper of said shafts, a one direction conveyer on the second shaft, and an opposite direction conveyer on the third shaft.

8. A housing, three conveyer parallel shafts in said housing, said shafts being one above the other, right and left hand conveyers on the upper of said shafts, a supply chute, to said conveyers, an adjustable plate for varying the supply from the chute between said conveyers, a one direction conveyer on the second shaft, and an opposite direction conveyer on the third shaft.

9. A nodulizer embodying a supply chute, conveyers therebelow, and an adjustable valve between said chute and conveyers for varying the proportion of material from said chute as between said conveyers.

In witness whereof I affix my signature.

JOHN C. SCHAFFER.